(12) United States Patent
Kanda

(10) Patent No.: US 7,304,918 B2
(45) Date of Patent: Dec. 4, 2007

(54) SERVO ERROR SIGNAL GENERATION CIRCUIT AND SERVO ERROR SIGNAL GENERATION METHOD

(75) Inventor: Yoshihiro Kanda, Toyono-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 546 days.

(21) Appl. No.: 10/948,310

(22) Filed: Sep. 24, 2004

(65) Prior Publication Data
US 2005/0281151 A1    Dec. 22, 2005

(30) Foreign Application Priority Data
Sep. 24, 2003   (JP)   ............................ 2003-331148

(51) Int. Cl.
*G11B 7/00*   (2006.01)
(52) U.S. Cl. ................................. 369/44.28; 369/44.34
(58) Field of Classification Search ............. 369/44.34, 369/447.28
See application file for complete search history.

(56) References Cited

U.S. PATENT DOCUMENTS

| | | | |
|---|---|---|---|
| 5,490,133 A * | 2/1996 | Nakamura et al. | 369/44.23 |
| 5,706,264 A | 1/1998 | Ando | |
| 6,215,751 B1 * | 4/2001 | Tsuchinaga | 369/47.35 |
| 6,459,664 B1 * | 10/2002 | Yamada et al. | 369/44.32 |
| 6,580,676 B1 * | 6/2003 | Yanagisawa et al. | 369/124.02 |
| 6,721,242 B2 | 4/2004 | Ohnishi et al. | |
| 6,738,325 B2 * | 5/2004 | Mashimo | 369/44.38 |
| 6,980,497 B2 * | 12/2005 | Tsukihashi et al. | 369/44.38 |
| 2002/0141301 A1 | 10/2002 | Ohnishi et al. | |
| 2005/0041562 A1 * | 2/2005 | Yang et al. | 369/116 |
| 2006/0120252 A1 * | 6/2006 | Kanda et al. | 369/125 |

FOREIGN PATENT DOCUMENTS

| | | |
|---|---|---|
| CN | 1118462 | 3/1996 |
| CN | 1246702 | 3/2000 |
| CN | 1327588 | 12/2001 |
| JP | 8-279165 | 10/1996 |
| JP | 11-238245 | 8/1999 |
| WO | 01/18809 | 3/2001 |

OTHER PUBLICATIONS

JP 08-279-165 Okuyama Atsushi (Oct. 1996) (translation).*

* cited by examiner

*Primary Examiner*—Wayne Young
*Assistant Examiner*—Van T. Pham
(74) *Attorney, Agent, or Firm*—Wenderoth, Lind & Ponack, L.L.P.

(57) ABSTRACT

A servo error signal generation circuit comprises a first sampling unit for sampling first detection signals at first sampling timings, a second sampling unit for sampling second detection signals at second sampling timings which are obtained by periodically thinning out the first sampling timings, an AD converter for analog-to-digital converting the data sampled by the first and second sampling units, and a completion unit for completing the sampling date of the timings which have been thinned out by the sub sampling timing generator, for the data which have been sampled by the second sampling unit and outputted from the AD converter.

13 Claims, 10 Drawing Sheets

US 7,304,918 B2

SERVO ERROR SIGNAL GENERATION CIRCUIT AND SERVO ERROR SIGNAL GENERATION METHOD

FIELD OF THE INVENTION

The present invention relates to a servo error signal generation circuit of an optical disc playback apparatus, and a servo error signal generation method.

BACKGROUND OF THE INVENTION

In recent years, a new optical system as disclosed in Japanese Published Patent Application No. 2000-82226 has been developed with respect to a servo error generation circuit of an optical disc playback apparatus in order to increase accuracy of a servo error signal.

The above-mentioned literature discloses the technique of, with a sub beam receptor provided in addition to a main beam receptor, correcting a servo error signal obtained from the main beam receptor on the basis of the result of arithmetic operation performed on the output of the sub beam receptor. This technique prevents offset of a tracking error signal due to lens shift, and leakage of a track cross signal into a focus error signal.

Meanwhile, digitization of the servo error generation circuit has also been progressed, and the signal before the arithmetic operation of the servo error signal is generally AD (analog-to-digital) converted to perform servo error arithmetic processing by a digital circuit.

FIG. 10 is a block diagram illustrating the construction of a conventional servo error signal generation circuit in the case where a servo error signal is corrected by the above-mentioned method.

With reference to FIG. 10, the conventional servo error signal generation circuit is connected to a main-beam receptor 101 and a sub-beam receptor 102, and comprises an error signal 1F generator 103f, an error signal 2F generator 104f, an error signal 1T generator 103t, an error signal 2T generator 104t, switches 105a, 105b, 105c, and 105d, a sampling unit 106, an ADC (analog-to-digital converter) 107, registers 108f, 109f, 108t, and 109t, and adders 110f and 110t.

The main-beam receptor 101 detects reflected light of a main beam from an optical disc. Further, the sub-beam receptor 102 detects reflected light of a sub beam from the optical disc, and detects a signal for assisting or correcting a detection signal from the main beam receptor 101.

The error signal 1F generator 103f operates the output of the main beam receptor 101 to output a focusing-side main error signal (Fmain), and the error signal 2F generator 104f operates the output of the sub beam receptor 102 to output a focusing-side sub error signal (Fsub).

Further, the error signal 1T generator 103t operates the output of the main beam receptor 101 to output a tracking-side main error signal (Tmain), and the error signal 2T generator 104t operates the output of the sub beam receptor 102 to output a tracking-side sub error signal (Tsub).

The sampling unit 106 performs switching among the switches 105a~105d at a timing obtained by dividing a predetermined sampling period into four periods, and successively outputs, to the ADC 107, the signals outputted from the error signal 1F generator 103f, the error signal 2F generator 104f, the error signal 1T generator 103t, and the error signal 2T generator 104t.

The ADC 107 is an AD converter for performing analog-to-digital conversion of an input signal.

The register 108f temporarily holds the output signal from the error signal 1F generator 103f, which has been AD-converted by the ADC 107. The register 109f temporarily holds the output signal from the error signal 2F generator 104f, which has been AD-converted by the ADC 107. The register 108t temporarily holds the output signal from the error signal 1T generator 103t, which has been AD-converted by the ADC 107. The register 109t temporarily holds the output signal from the error signal 2T generator 104t, which has been AD-converted by the ADC 107.

The adder 110f adds the output from the register 108f and the output from the register 109f to obtain a focus error signal output as an error signal output. Further, the adder 110t adds the output from the register 108t and the output from the register 109t to obtain a tracking error signal output as an error signal output.

Next, the operation will be described.

Initially, the error signal 1F generator 103f and the error signal 1T generator 103t, which have received the output signals from the main beam receptor 101, generate a Fmain signal and a Tmain signal, respectively. Further, the error signal 2F generator 104f and the error signal 2T generator 104t, which have received the output signals from the sub beam receptor 102, generate a Fsub signal and a Tsub signal, respectively.

Next, the four signals Fmain, Fsub, Tmain, and Tsub, which are generated by the error signal 1F generator 103f, the error signal 1T generator 103, the error signal 2F generator 104f, and the error signal 2T generator 104t, respectively, are successively output to the ADC 107 within a sampling period under switching control of the switches 105a to 105d by the sampling unit 106.

The ADC 107 performs AD conversion on the successively inputted signals. The AD-converted four signals Fmain, Fsub, Tmain, and Tsub are stored in the registers 108f, 109f, 108t, and 109t, respectively.

Thereafter, the adder 110f (110t) reads the data stored in the registers 108f and 109f (108t and 109t) at every sampling period, and calculates a servo error signal. Thereby, corrected focus error signal and tracking error signal are obtained for every sampling frequency fs.

Next, the operation of the sampling unit 106 will be described with reference to FIG. 11.

FIG. 11 is a timing chart for explaining the operation of the sampling unit 106.

As shown in FIG. 11, the sampling unit 106 performs switching control of the switches 105a to 105d, and successively outputs FM (Fmain) generated by the error signal 1F generator 103f, TM (Tmain) generated by the error signal 1T generator 103, FS (Fsub) generated by the error signal 2F generator 104f, and TS (Tsub) generated by the error signal 2T generator 104t, within the sampling period, in the order shown in FIG. 11.

Next, the operation of the conventional servo error detection circuit will be described with reference to a waveform diagram shown in FIG. 12.

FIG. 12 is a waveform diagram for explaining the operation of the conventional servo error detection circuit.

FIG. 12 shows, from top to bottom, a sampling timing (fs), a main error signal (main) as an output of the error signal 1F generator 103f or the error signal 1T generator 103t, a sub error signal (sub) as an output of the error signal 2F generator 104f or the error signal 2T generator 104t, an AD-converted output of the main error signal (main AD) stored in the register 108f or 108t, an AD-converted output of the sub error signal (sub AD) stored in the register 109f or 109t, and an error signal outputted from the adder 110f or 110t.

The main error signal (main) and the sub error signal (sub) are sampled at the sampling timing fs by the sampling unit 106, thereby obtaining main AD and sub AD. Then, the main AD and the sub AD are added at every sampling timing fs, thereby obtaining an error signal in which an unnecessary noise component existing in the main error signal is corrected by the sub error signal.

In the conventional service error signal generation circuit, however, since the four signals including the main error signal and the sub error signal must be subjected to AD conversion within the sampling period as shown in FIG. 11, the conversion time of the AD converter must be equal to or shorter than ¼ of the sampling period, and a double-high conversion speed is required as compared with the case where only the main error signal is converted.

Further, when the processing speed of the AD converter is not sufficient, the sampling frequency must be reduced.

SUMMARY OF THE INVENTION

The present invention is made to solve the above-described problems and has for its object to provide a servo error signal generation circuit that is able to maintain a high sampling frequency while maintaining the effect of correcting error signals with sub error signals, even when the conversion speed of an AD converter incorporated in the servo error signal generation circuit is low.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a servo error signal generation circuit for generating a servo error signal using reflected light from an optical disc, which is detected by plural photoreceptors, and the circuit comprises: a first sampling unit for sampling, at first sampling timings, first detection signals which are outputted from the plural photoreceptors; a sub sampling timing generator for periodically thinning out the first sampling timings to generate second sampling timings having a reduced sampling frequency; a second sampling unit for sampling, at the second sampling timings, second detection signals which are outputted from plural photoreceptors and assist or correct the first detection signals; an AD converter for analog-to-digital converting the data which have been sampled by the first sampling unit and the second sampling unit; and a completion unit for completing the data of the timings which have been thinned out by the sub sampling timing generator, among the data which have been sampled by the second sampling unit and outputted from the AD converter. Therefore, even when the conversion speed of the AD converter is low, a high sampling frequency can be maintained while maintaining the effect of correcting the error signals on the basis of the second detection signals.

According to a second aspect of the present invention, in the servo error signal generation circuit according to the first aspect, the completion unit performs completion using the values of sampling data which have just previously been sampled by the second sampling unit. Therefore, the completion unit can carry out the completion process with a very simple circuit construction.

According to a third aspect of the present invention, in the servo error signal generation circuit according to the first aspect, the completion unit performs completion using the values of sampling data which have just previously been sampled by the second sampling unit and, thereafter, compensates phase delay of the completed data. Therefore, phase delay due to the completion can be compensated, thereby avoiding adverse effect of phase delay on the servo performance.

According to a fourth aspect of the present invention, in the servo error signal generation circuit according to the first aspect, the completion unit further comprises: a difference detector for detecting a difference between the data which are sampled by the first sampling unit and the data which have just previously been sampled by the first sampling unit; a holding unit for outputting the sampling data which have just previously been sampled by the second sampling unit; and a difference completion unit for generating completed data by subtracting or adding the difference detected by the difference detector from/to the values of the just-previous sampling data outputted from the holding unit. Therefore, the completion unit can carry out highly accurate completion process with a simple circuit construction.

According to a fifth aspect of the present invention, in the servo error signal generation circuit according to the fourth aspect, a low-pass filter for noise removal is provided at either or both of the front and the rear of the difference detector. Therefore, the completion unit can carry out more accurate completion process.

According to a sixth aspect of the present invention, there is provided a servo error signal generation circuit for generating a servo error signal using reflected light from an optical disc which is detected by plural photoreceptors, and the circuit comprises: a first sampling unit for sampling, at first sampling timings, first detection signals outputted from the plural photoreceptors; a second sampling unit for sampling, at second sampling timings, second detection signals which are outputted from the plural photoreceptors, and assist or correct the first detection signal; an AD converter for analog-to-digital converting the data which have been sampled by the first sampling unit and the second sampling unit; and a completion unit for generating completed data synchronized with the first sampling by predicting a next change on the basis of the data which have been sampled by the second sampling unit and outputted from the AD converter. Therefore, the above-mentioned sub sampling timing generator can be dispensed with, and a high sampling frequency can be maintained while maintaining the effect of correcting the error signals on the basis of the second detection signals, with a simple circuit construction.

According to a seventh aspect of the present invention, in the servo error signal generation circuit according to the sixth aspect, the second sampling timings are generated independently of the first sampling timings, and are not synchronized with the first sampling timings.

DETAILED DESCRIPTION OF THE PREFERRED EMBODIMENT

Embodiment 1

In a servo error signal generation circuit according to the present invention, a sampling frequency of a signal from a sub photoreceptor is lowered with respect to a sampling frequency of a signal from a main photoreceptor, and AD conversion for the signal from the sub photoreceptor is carried out with the lowered sampling frequency, thereby to reduce a burden on processing of an AD converter.

Figure 1:
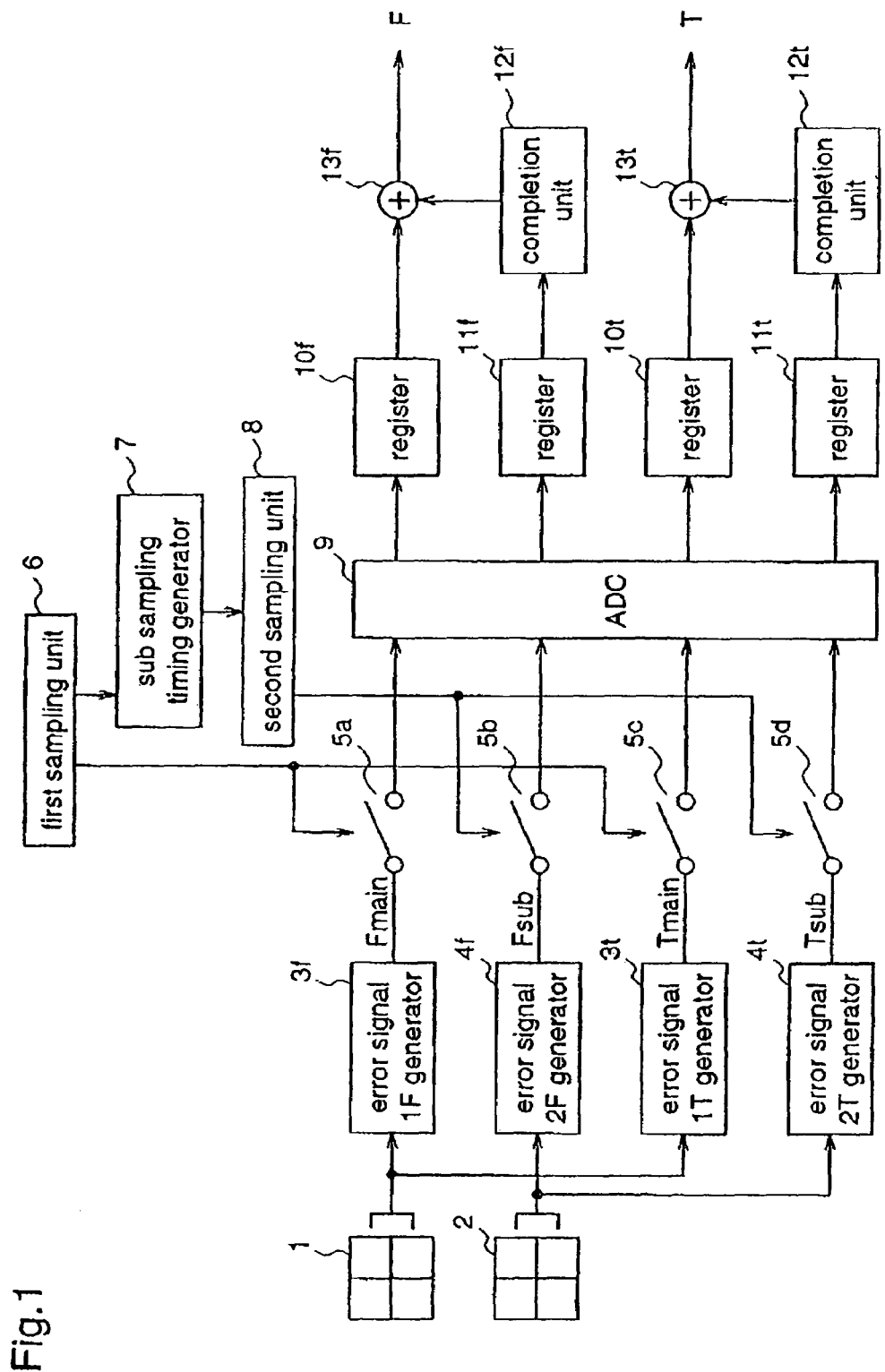
FIG. 1 is a block diagram illustrating the construction of a servo error signal generation circuit according to a first embodiment of the present invention.

FIG. 1 is a block diagram illustrating an example of a servo error signal generation circuit according to the first embodiment of the present invention.

In FIG. 1, the servo error signal generation circuit according to the first embodiment is connected to a main beam receptor 1 and a sub beam receptor 2, and comprises an error signal 1F generator 3f, an error signal 2F generator 4f, an error signal 1T generator 3t, an error signal 2T generator 4t, switches 5a, 5b, 5c, and 5d, a first sampling unit 6, a sub sampling timing generator 7, a second sampling unit 8, an ADC (analog-to-digital converter) 9, registers 10f, 11f, 10t, and 11t, completion units 12f and 12t, and adders 13f and 13t.

The main beam receptor 1 comprises plural photoreceptors, and detects reflected light of a main beam from an optical disc by the plural photoreceptors (hereinafter, signals thus detected are appropriately referred to as first detection signals). On the other hand, the sub beam receptor 2 comprises plural photoreceptors, and detects reflected light of a sub beam from the optical disc by the plural photoreceptors (hereinafter, signals thus detected are appropriately referred to as second detection signals), that is, it detects signals for assisting or correcting the detection signals from the main beam receptor 1.

The error signal 1F generator 3f operates the output of the main beam receptor 1 to output a focusing-side main error signal (Fmain), and the error signal 2F generator 4f operates the output of the sub beam receptor 2 to output a focusing-side sub error signal (Fsub).

Further, the error signal 1T generator 3t operates the output of the main beam receptor 1 to output a tracking-side main error signal (Tmain), and the error signal 2T generator 4t operates the output of the sub beam receptor 2 to output a tracking-side sub error signal (Tsub).

The first sampling unit 6 performs sampling on the signals from the error signal 1F generator 3f and the error signal 1T generator 3t, which have been obtained by subjecting the signals outputted from the plural photoreceptors of the main beam receptor 1 to predetermined arithmetic processing, at predetermined first sampling timings, by controlling switching between the switch 5a and the switch 5c.

The sampling timing generator 7 periodically thins out the first sampling timings to generate second sampling timings having a lowered sampling frequency.

The second sampling unit 8 performs sampling on the signals from the error signal 2F generator 4f and the error signal 2T generator 4t, which have been obtained by subjecting the signals outputted from the plural photoreceptors of the sub beam receptor 2 to predetermined arithmetic processing, at the second sampling timings generated in the sampling timing generator 7, by controlling switching between the switch 5b and the switch 5d.

The ADC 9 successively AD-converts the output data from the error signal 1F generator 3f, the error signal 2F generator 4f, the error signal 1T generator 3t, and the error signal 2T generator 4t, which have been sampled at the predetermined timings by the first sampling unit 6 and the second sampling unit 8.

The register 10f temporarily holds the output signal from the error signal 1F generator 3f, which has been AD converted by the ADC 9. The register 11f temporarily holds the output signal from the error signal 2F generator 4f, which has been AD converted by the ADC 9. The register 10t temporarily holds the output signal from the error signal 1T generator 3t, which has been AD converted by the ADC 9. The register 11t temporarily holds the output signal from the error signal 2T generator 4t, which has been AD converted by the ADC 9.

The completion units 12f and 12t receive the AD-converted result of the data sampled by the second sampling unit 8, and completes the sampling data of the timings thinned out by the sub sampling timing generator 7.

The adders 13f and 13t correct the servo error signal obtained from the output signal of the main beam receptor 1, using the servo error signal obtained from the output signal of the sub beam receptor 2. To be specific, the adder 13f adds the output of the register 10f and the output of the completion unit 12f to obtain a focus error signal output as an error signal output. On the other hand, the adder 13t adds the output of the register 10t and the output of the completion unit 12t to obtain a tracking error signal output as an error signal output. In this first embodiment, it is premised that the signal change direction with respect to the spot displacement direction does not vary between "main" and "sub", i.e., these error signals have the same polarity. However, when these error signals have different polarities, the adders 13f and 13t add the output values from the completion units 12f and 12t, the polarities of which are changed, to the output values of the registers 10f and 10t, respectively.

Next, the operation will be described.

Initially, the error signal 1F generator 3f and the error signal 1T generator 3, which have received the output signals from the main beam receptor 1, generate a Fmain signal and a Tmain signal, respectively. Further, the error signal 2F generator 4f and the error signal 2T generator 4t, which have received the output signal from the sub beam receptor 2, generate a Fsub signal and a Tsub signal, respectively.

Next, the four signals Fmain, Fsub, Tmain, and Tsub, which have been generated in the error signal 1F generator 3f, the error signal 2F generator 4f, the error signal 1T generator 3t, and the error signal 2T generator 4t, are successively output to the ADC 9 by controlling switching among the switches 5a to 5d with the first sampling unit 6 and the second sampling unit 8.

To be specific, the first sampling unit 6 controls switching between the switch 5a and the switch 5c, whereby the Fmain signal and the Tmain signal are output to the ADC 9 at the first sampling timings. The second sampling unit 8 controls switching between the switch 5b and the switch 5d, whereby the Fsub signal and the Tsub signal are output to the ADC 9 at the second sampling timings. The second sampling timings are generated by periodically thinning out the first sampling timings by the second sampling timing generator 7.

Therefore, the Fmain signal and the Tmain signal, which have been obtained by subjecting the first detection signals outputted from the main beam receptor 1 to predetermined arithmetic processing, are output to the ADC 9 at the first sampling timings, and the Fsub signal and the Tsub signal, which have been obtained by subjecting the second detection signals outputted from the sub beam receptor 2 to predetermined arithmetic processing, are output to the ADC 9 at the second sampling timings that are obtained by thinning out the first sampling timings.

The ADC 107 performs AD conversion on the data which have been sampled by the first sampling unit 6 and the second sampling unit 8, and the AD-converted tour signals Fmain, Fsub, Tmain, and Tsub are stored in the registers 10f, 11f, 10t, and 11t, respectively.

Then, the completion units 12f and 12t are operated for every first sampling timing, and outputs the signals stored in the registers 11f and 11t to the adders 13f and 13t, respectively, when AD conversion of the sub error signal is carried out within the sampling period. On the other hand, when the AD conversion is not carried out, the completion units 12f and 12t complete the sampling data at the corresponding timings, and outputs the completed data to the adders 13f and 13t, respectively.

Thereafter, the adder 13f adds the signal from the register 10f and the signal from the completion unit 12f at every sampling period, thereby generating a focus error signal as an error signal to be output.

Further, the adder 13t adds the signal from the register 10t and the signal from the completion unit 12t at every sampling period, thereby generating a tracking error signal as an error signal to be output.

Thereby, the effect of correction by the sub error signal can be maintained with the sampling frequency of the error signals outputted from the adders 13f and 13t being maintained at fs.

Next, the operation of the servo error signal generation circuit of the present invention will be described in more detail with reference to FIGS. 2 and 3, taking, for example, the case where the second sampling timing generated by the sampling timing generator 7 is half the first sampling timing.

Figure 2:
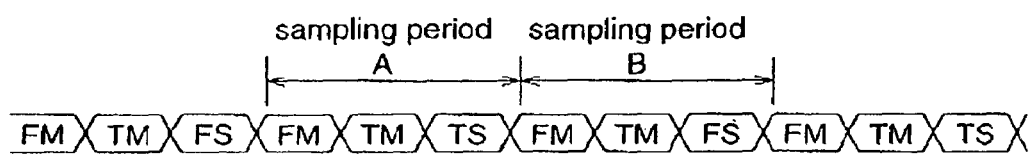
FIG. 2 is a timing chart for explaining the operations of a first sampling unit and a second sampling unit.

FIG. 2 is a timing chart for explaining the operations of the first sampling unit 6 and the second sampling unit 8.

As shown in FIG. 2, the first sampling unit 6 controls switching between the switch 5a and the switch 5c, and samples the FM (Fmain) generated by the error signal 1F generator 3f and the TM (Tmain) generated by the error signal 1T generator 3t in the full sampling period, i.e., at the first sampling timings. On the other hand, the second sampling unit 8 controls switching between the switch 5b and the switch 5d, and alternately samples the FS (Fsub) generated by the error signal 2F generator 4f and the TS (Tsub) generated by the error signal 2T generator 4t on the basis of the second sampling timings generated by the sampling timing generator 7.

Thereby, the signals generated by the error signal 1F generator 3f, the error signal 2F generator 4f, the error signal 1T generator 3t, and the error signal 2T generator 4t are input to the ADC 9 in the order shown in FIG. 2, and the number of sampling times within one sampling period can be reduced to three.

Next, the operation of the servo error detection circuit according to the present invention will be described with reference to a waveform diagram shown in FIG. 3.

Figure 3:
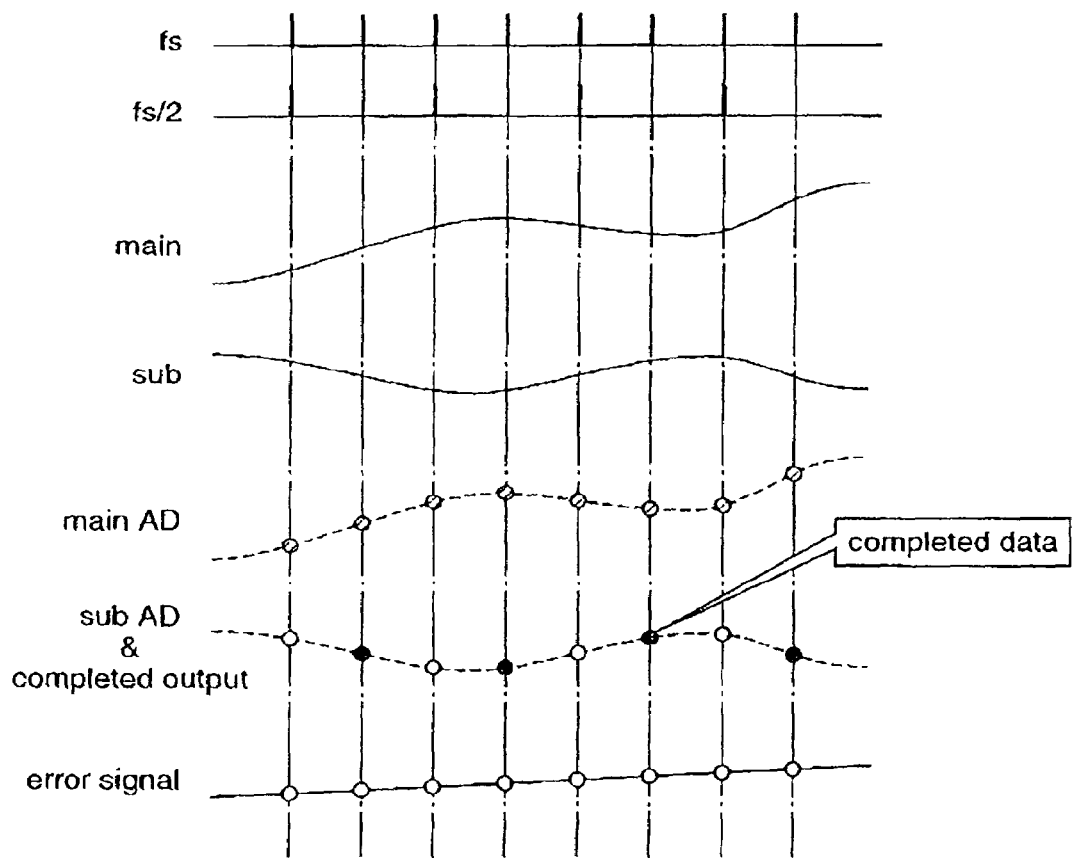
FIG. 3 is a waveform diagram for explaining the operation of the servo error signal generation circuit according to the first embodiment.

FIG. 3 is a waveform diagram for explaining the operation of the servo error detection circuit according to the first embodiment.

FIG. 3 shows, from top to bottom, a sampling timing signal (fs) of the main error signal as the first sampling timing; a sampling timing signal (fs/2) of the sub error signal as the second sampling timing; a main error signal (main) outputted from the error signal 1F generator 3f or the error signal 1T generator 3t; a sub error signal (sub) outputted from the error signal 2F generator 4f or the error signal 2T generator 4t; an AD-converted output of the main error signal (main AD) stored in the register 10f or 10t; a signal comprising an AD-converted output of the sub error signal (sub AD—white dot) stored in the register 11f or 11t, and completed data (completed output—black dot); and an error signal outputted from the adder 13f or 13t.

As shown in FIG. 3, the main error signal (main) is sampled at the first sampling timing fs by the first sampling unit 6 and then AD-converted, thereby obtaining the main AD.

On the other hand, the sub error signal (sub) is sampled at the second sampling timing by the second sampling unit 9 and then AD-converted, thereby obtaining the sub AD (white dot). Since the second sampling timing is half the first sampling timing, the second sampling timing is ½.

If the AD-converted sub AD (white dot) cannot be obtained at the first sampling timing fs, the completion unit 15f (15t) generates sub AD (black dot) at the corresponding timing by completion.

Thereby, the effect of correction by the sub error signal can be maintained with the sampling frequency of the error signal outputted from the adder 13f (13t) being maintained at fs.

Next, the process of generating completed data by the completion units of the servo error signal generation circuit according to the first embodiment will be described with reference to FIGS. 4 to 9.

Figure 4:
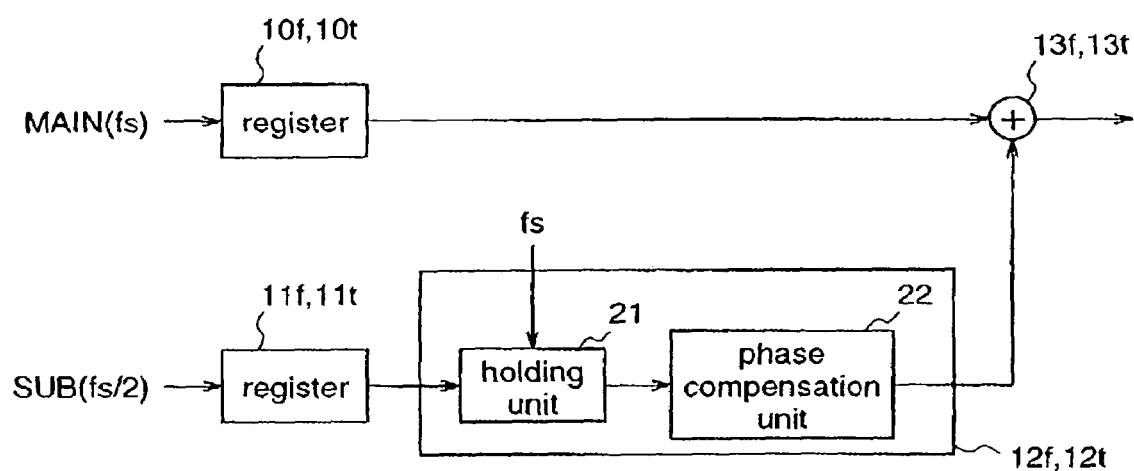
FIG. 4 is a block diagram for explaining a first completion processing to be performed by a completion unit of the servo error signal generation circuit according to the first embodiment.
Figure 5:
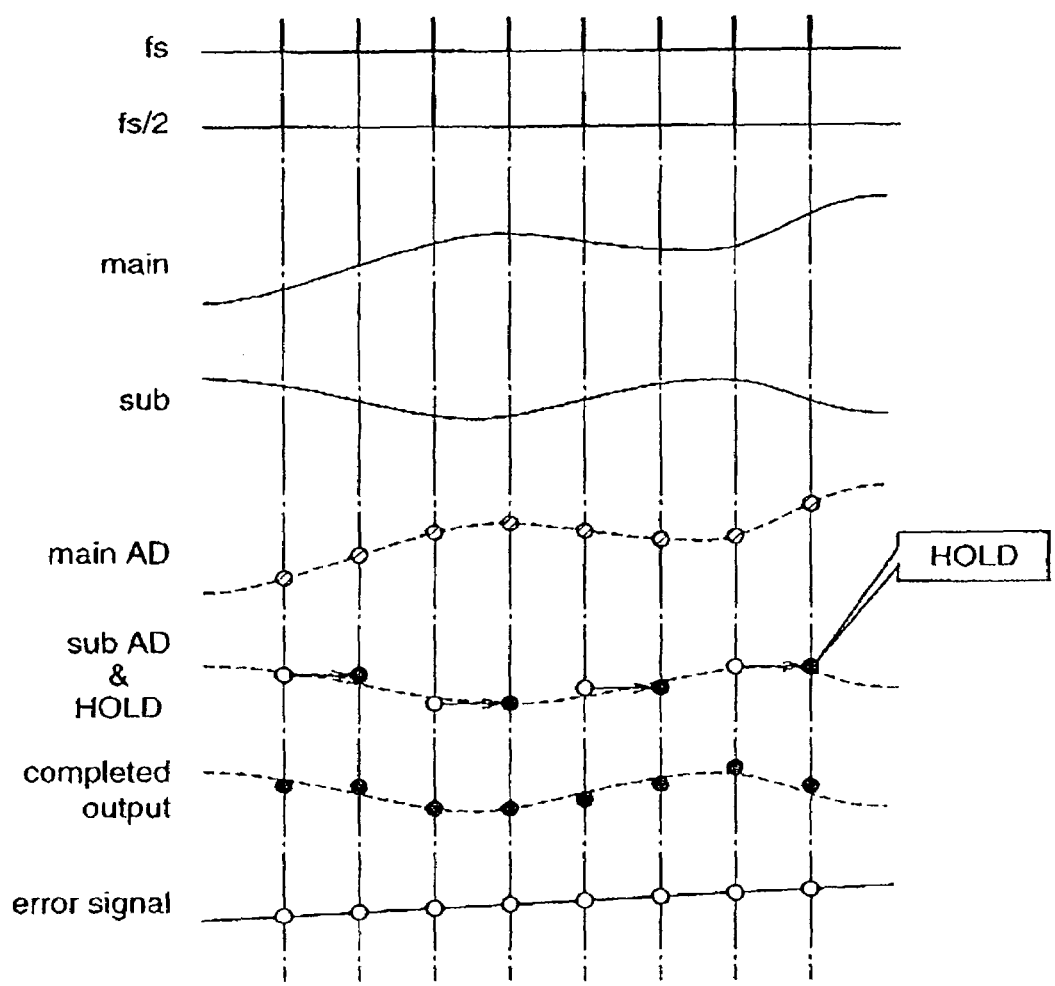
FIG. 5 is a waveform diagram for explaining the operation of the servo error signal generation circuit according to the first embodiment in the case where the first completion processing is carried out.

FIGS. 4 and 5 are diagrams for explaining the first completion processing by the completion units.

FIG. 4 is a block diagram for explaining the first completion processing that is carried out by the completion units of the servo error signal generation circuit according to the first embodiment, wherein parts other than the completion units are simplified.

In FIG. 4, the completion unit 12f (12t) comprises a holding unit 21 and a phase compensation unit 22.

The holding unit 21 is operated at the sampling timing fs, and outputs the output of the ADC 9 as it is when the ADC 9 is operated at the operation timing of the holding unit 21. When the ADC 9 is not operated, the holding unit 21 outputs the just previous data.

The phase compensation unit 22 compensates phase delay due to the holding operation performed by the holding unit 21. For example, the phase compensation unit 22 is implemented by a lead lag filter.

FIG. 5 is a waveform diagram for explaining the operation of the servo error detection circuit according to the first embodiment in the case where the first completion processing is carried out.

FIG. 5 shows, from top to bottom, a sampling timing signal (fs) of the main error signal as the first sampling timing; a sampling timing signal (fs/2) of the sub error signal as the second sampling timing; a main error signal (main) outputted from the error signal 1F generator 3f or the error signal 1T generator 3t; a sub error signal (sub) outputted from the error signal 2F generator 4f or the error signal 2T generator 4t; an AD-converted output of the main error signal (main AD) stored in the register 10f or 10t; a signal comprising an AD-converted output of the sub error signal (sub AD—white dot) stored in the register 11f or 11t, and the output of the holding unit 21 (HOLD—black dot); the output of the phase compensation unit 22 (completed output); and an error signal outputted from the adder 13f or 13t.

As shown by "sub AD & HOLD" in FIG. 5, when there exists the AD-converted output of the sub error signal (sub AD) at the sampling timing fs as the first sampling timing, the holding unit 21 outputs the AD-converted output of the sub error signal as it is to the phase compensation unit 22. When there is no AD-converted output of the sub error signal (sub AD), the holding unit 21 outputs the just-previous AD-converted output of the sub error signal to the phase compensation unit 22.

Thereby, data is outputted at the sampling timing fs from the holding unit 21, and its value is updated at the sampling timing fs/2 with which the ADC 9 is operated.

Thereafter, phase delay of the data outputted from the holding unit 21 is compensated by the phase compensation unit 22 comprising a lead lag filter or the like, and the data is outputted as the completed output from the completion unit 12f (12t).

Then, the AD-converted output of the main error signal, which is stored in the register 10f (10t), and the completed output from the completion unit 12f (12t) are added by the adder 13f (13t), resulting in an error signal output (error signal).

As described above, since each of the completion units 12f and 12t performing the first completion processing is provided with the holding unit 21 and the phase compensation unit 22, the data of the sampling frequency fs/2 can be completed by a very simple circuit construction, and the data of the sampling frequency fs can be reconstructed.

If the phase delay due to the holding unit 21 is negligible when viewed from the whole servo system of the optical disc playback apparatus, the phase compensation unit 22 may be dispensed with. In this case, the circuit construction can be further simplified.

Further, since the holding unit 21 uses the output of the register 11f(11t) shown in FIG. 1 as it is, the operation of the holding unit 21 can be realized as follows.

That is, since the contents of the register 11f (11t) is updated only when the Fsub (Tsub) is AD-converted, the just-previous result of AD conversion, which is stored in the register 11f (11t), is automatically outputted when AD conversion is not carried out at the first sampling timing fs. Thereby, the same function as in the case using the holding unit 21 can be realized very easily, without the need for a circuit for completion.

Next, the second completion processing by the completion units 12f and 12t will be described with reference to FIGS. 6 and 7.

Figure 6:
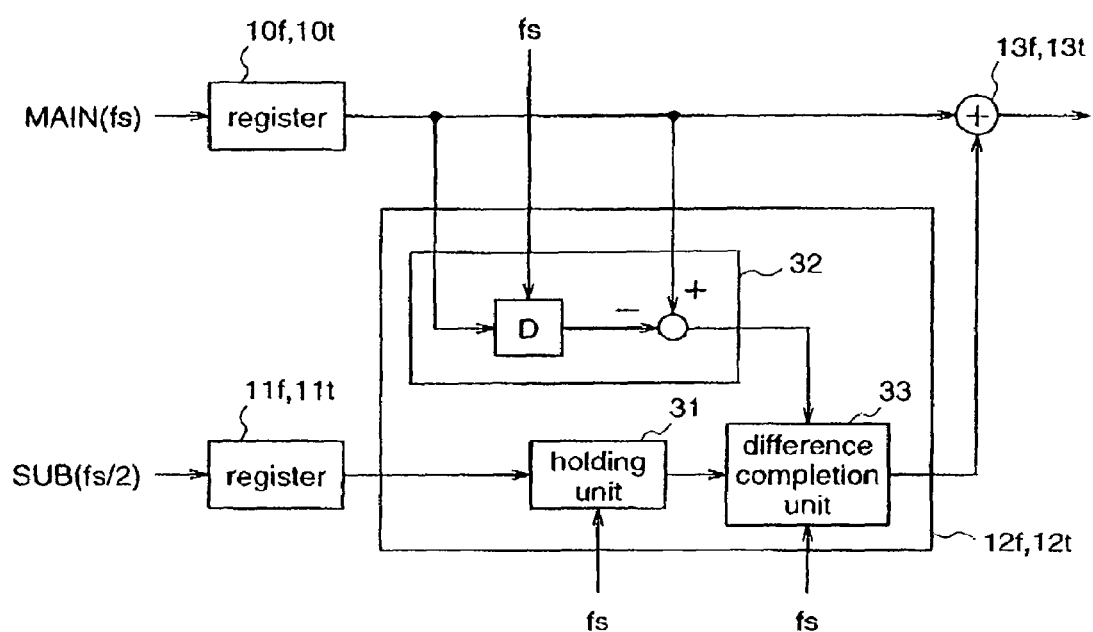
FIG. 6 is a block diagram for explaining a second completion processing to be performed by the completion unit of the servo error signal generation circuit according to the first embodiment.

FIG. 6 is a block diagram for explaining the second completion processing to be carried out by the completion units of the servo error signal generation circuit according to the first embodiment.

In FIG. 6, the completion unit 12f (12t) comprises a holding unit 31, a difference detector 32, and a difference completion unit 33.

The holding unit 31 is operated at the sampling timing fs, and outputs the output of the ADC 9 as it is when the ADC 9 is operated at the operation timing of the holding unit 31. When the ADC 9 is not operated, the holding unit 31 outputs the just-previous data. This function of the holding unit 31 can be realized by controlling the data output timing from the register 11f(11t), like the holding unit 21 which has been described for the first completion processing.

The difference detector 32 outputs, at every sampling timing fs, a difference between the AD-converted output of the main error signal (main AD) which is output from the ADC 9 at the sampling timing fs, and the just-previous AD-converted output of the main error signal. As shown in FIG. 6, the difference detector 32 has a delay circuit, and detects a difference between the AD-converted output of the main error signal which is output at the sampling timing fs, and the just-previous AD-converted output of the main error signal.

Since the processing performed by the difference detector 32 is identical to differentiation, there is a fear of considerable increase in noise when the S/N of the signal is poor. Therefore, a low-pass filter (LPF) for noise removal may be inserted at either or both of the front and the rear of the difference detector 32.

The difference completion unit 33 receives the output of the holding unit 31 and the output of the difference detector 32 at every sampling timing fs. When the output of the holding unit 31 is the data which has been held in the holding unit 31 (hereinafter referred to simply as "held data"), the difference completion unit 33 subtracts or adds the output of the difference detector 32 from/to the held data. When the output of the holding unit 31 is not the held data, the difference completion unit 33 outputs the inputted data as it is, thereby outputting a completed output at every sampling timing fs. In the difference completion unit 33, whether the output of the difference detector 32 is to be subtracted or added is determined according to whether the signal change direction with respect to the spot displacement direction varies between "main" and "sub" or not. To be specific, when the signal change direction with respect to the spot displacement direction does not vary between "main" and "sub", i.e., when the main error signal and the sub error signal have the same polarity, the difference completion unit 33 performs addition. On the other hand, when the signal change direction with respect to the spot displacement direction varies between "main" and "sub", the difference completion unit 33 performs subtraction. Since, in this first embodiment, it is premised that the main error signal and the sub error signal have the same polarity, the difference completion unit 33 performs addition in the following description.

Figure 7:
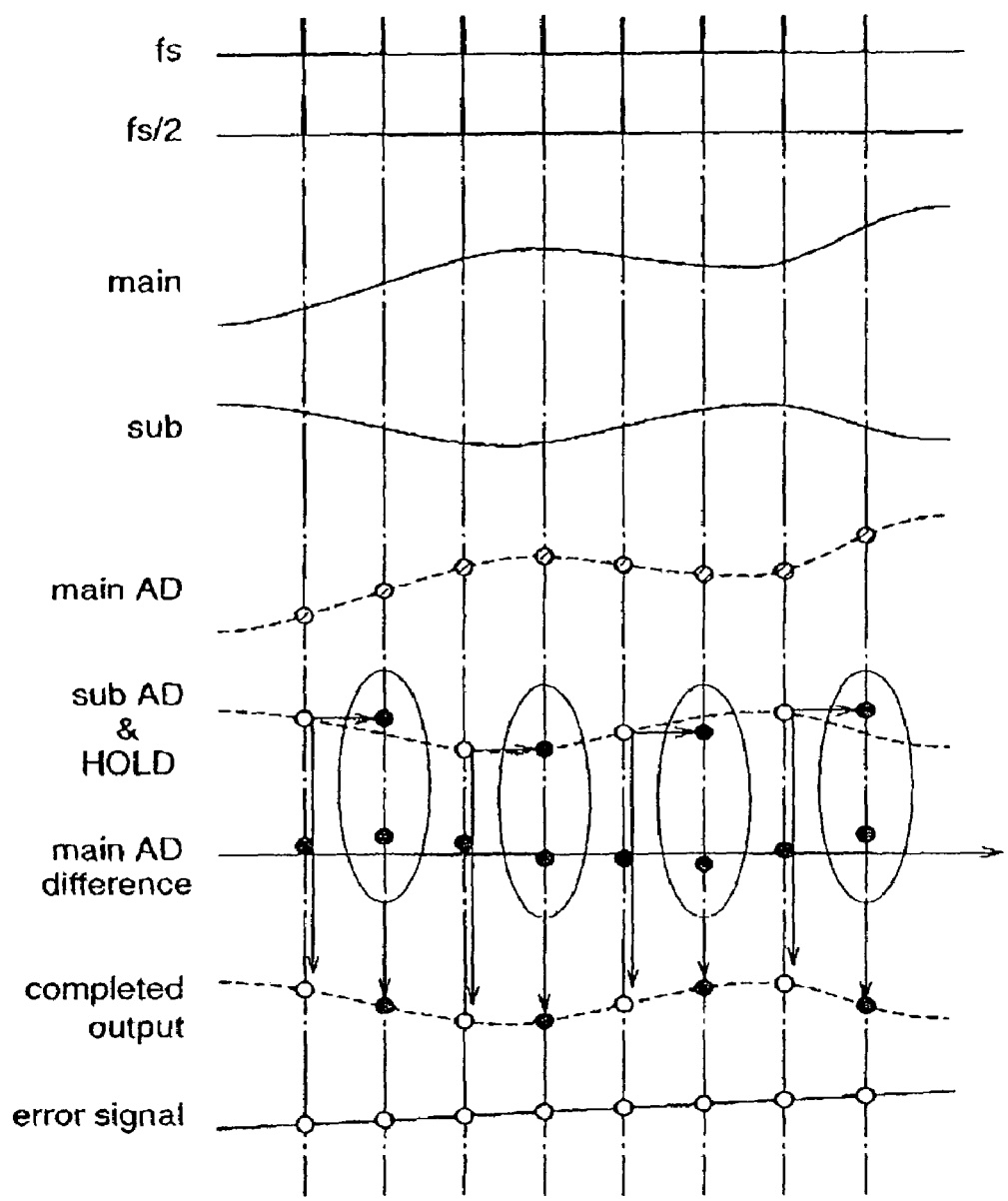
FIG. 7 is a waveform diagram for explaining the operation of the servo error signal generation circuit according to the first embodiment in the case where the second completion processing is carried out.

FIG. 7 is a waveform diagram for explaining the operation of the servo error detection circuit according to the first embodiment in the case where the second completion processing is carried out.

FIG. 7 shows, from top to bottom, a sampling timing signal (fs) of the main error signal as the first sampling timing; a sampling timing signal (fs/2) of the sub error signal as the second sampling timing; a main error signal (main) outputted from the error signal 1F generator 3f or the error signal 1T generator 3t; a sub error signal (sub) outputted from the error signal 2F generator 4f or the error signal 2T generator 4t; an AD-converted output of the main error signal (main AD) stored in the register 10f or 10t; a signal comprising an AD-converted output of the sub error signal (sub AD—white dot) stored in the register 11f or 11t, and the output of the holding unit 31 (HOLD—black dot); the output of the difference detector 32 (main AD difference); the output of the difference completion unit 33 (completed output); and an error signal outputted from the adder 13f or 13t.

As shown by "sub AD & HOLD" in FIG. 7, when there exists the AD-converted output of the sub error signal (sub AD) at the sampling timing fs that is the first sampling timing, the holding unit 31 outputs the AD-converted output of the sub error signal as it is to the phase compensation unit 22. When there is no AD-converted output of the sub error signal (sub AD), the holding unit 31 outputs the just-previous AD-converted output of the sub error signal to the difference completion unit 33.

Thereby, the holding unit 31 outputs the data at the sampling timing fs, and the value of the data is updated at the sampling timing fs/2 with which the ADC 9 is operated.

On the other hand, the difference detector 32 detects, at every sampling timing fs, a difference between the AD-converted output of the main error signal (main AD) which is outputted from the ADC9, and the just-previous AD-converted output of the main error signal, and outputs the difference to the difference completion unit 33.

Thereafter, the difference completion unit 33 receives the output of the holding unit 31 and the output of the difference detector 32 at every sampling timing fs. When the output of the holding unit 31 is the held data, the difference completion unit 33 adds the output of the difference detector 32 to the held data. When the output of the holding unit 31 is not the held data, the difference completion unit 33 outputs the inputted data as it is. Thus, the completion unit 33 outputs completed data at every sampling timing fs.

Then, the AD-converted output of the main error signal stored in the register 10f (10t) and the completed output from the completion unit 12f (12t) are added by the adder 13f (13t), resulting in an error signal output (error signal).

As described above, the completion unit 12f (12t) performing the second completion processing is provided with the difference detector 32 for detecting a difference between the data that is sampled by the first sampling unit 6 and the data that has been sampled just before this data; the holding unit 31 for outputting the data that has just previously been sampled by the second sampling unit 8; and the difference completion unit 33 for generating completed data by subtracting or adding the difference detected by the difference detector 32 from/to the held data outputted from the holding unit 31. Therefore, accurate completion processing can be carried out by the simple circuit construction.

In the second completion processing, the difference detector 32 detects a difference between the AD-converted outputs of the main error signal at the sampling timing fs. However, the difference detector 32 may output a difference between the AD-converted outputs of the main error signal only for the timing at which the holding unit 31 outputs the held data.

Next, a description will be given of the third completion processing by the completion units 12f and 12t with reference to FIGS. 8 and 9. The third completion processing described hereinafter uses a predictive filter. Therefore, in contrast to the first and second completion processings, it is not necessary for the first sampling timing and the second sampling timing to be synchronized with each other. So, when performing the third completion processing, the sub sampling timing generator 7 shown in FIG. 1 can be dispensed with.

Hereinafter, the third completion processing will be described with respect to the case where the first sampling timing is fs, and the second sampling timing is fs/a.

Figure 8:
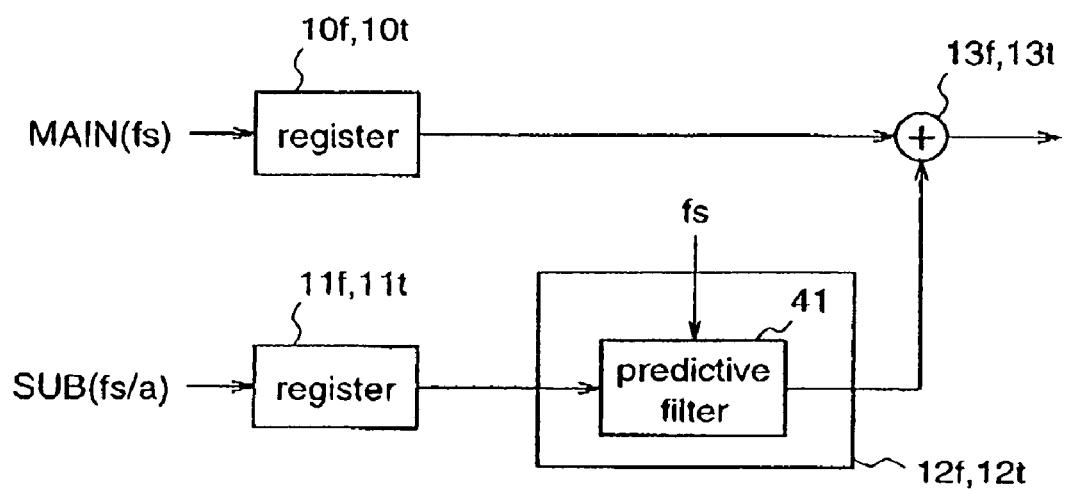
FIG. 8 is a block diagram for explaining a third completion processing to be performed by the completion unit of the servo error signal generation circuit according to the first embodiment.

FIG. 8 is a block diagram for explaining the third completion processing to be performed by the completion units of the servo error signal generation circuit according to the first embodiment, wherein parts other than the completion units are simplified.

In FIG. 8, the completion unit 12f (12t) comprises a predictive filter 41.

The predictive filter 41 receives the AD-converted output of the sub error signal stored in the register 11f (11t), which has been sampled at the second sampling timing fs/a, and performs conversion of the sampling frequency of the AD-converted output, and then predicts and generates data of the first sampling frequency fs. As for the construction of the predictive filter, a second or higher order approximation function may be used, or an observer that approximates the servo loop of the optical disc playback apparatus may be used.

Figure 9:
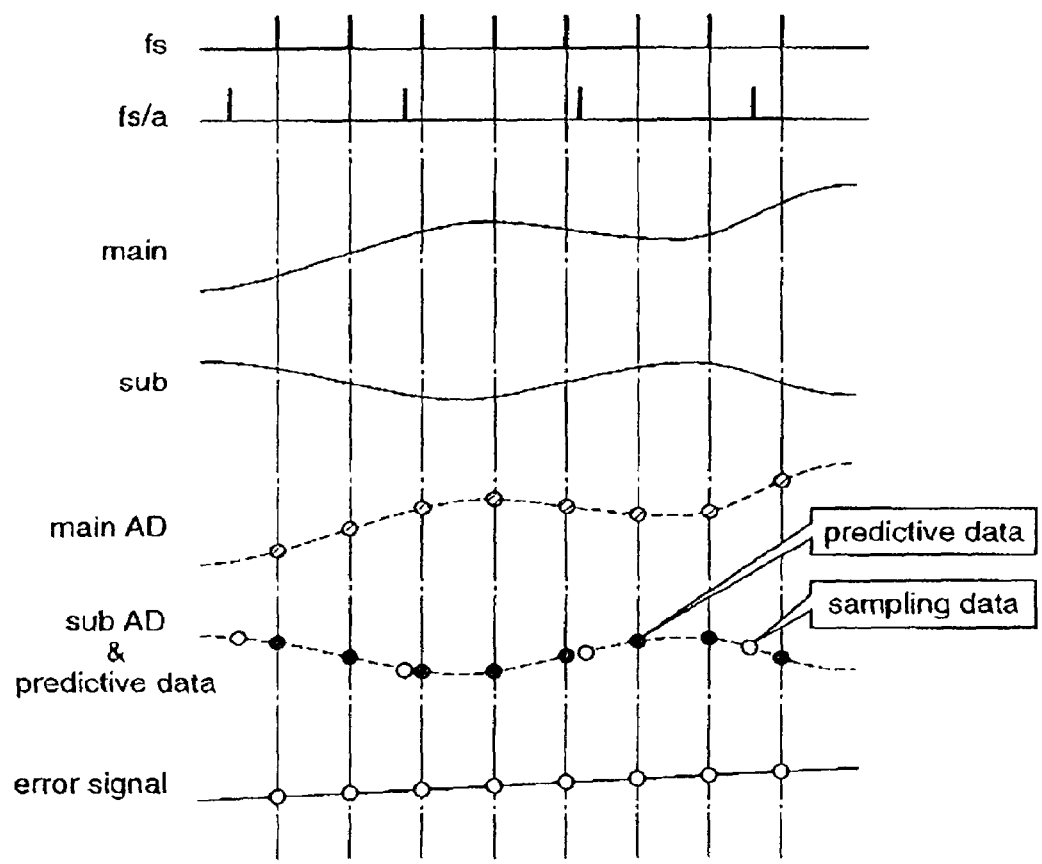
FIG. 9 is a waveform diagram for explaining the operation of the servo error signal generation circuit according to the first embodiment in the case where the third completion processing is carried out.
Figure 10:
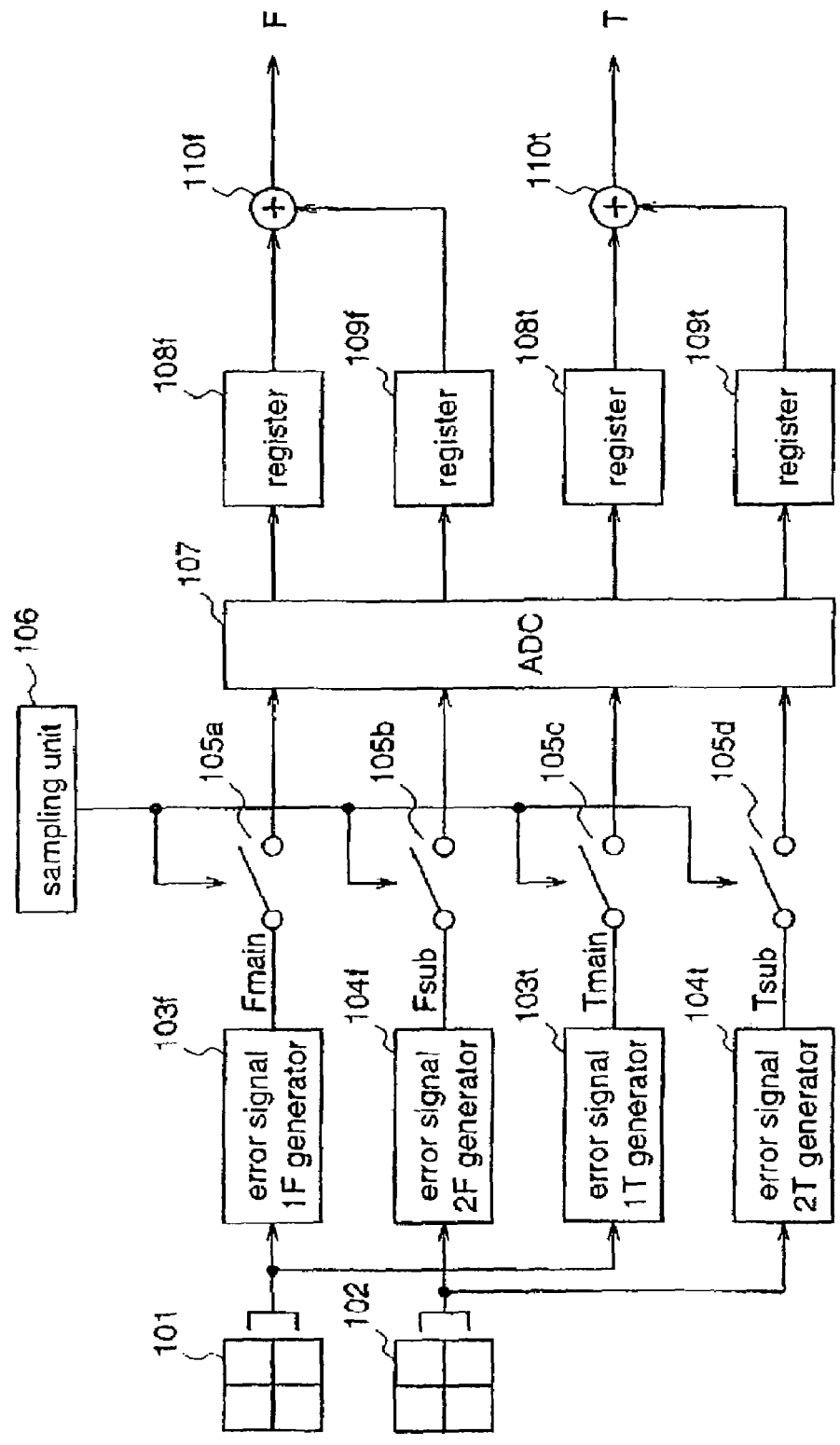
FIG. 10 is a block diagram illustrating the construction of the conventional servo error signal generation circuit.
Figure 11:
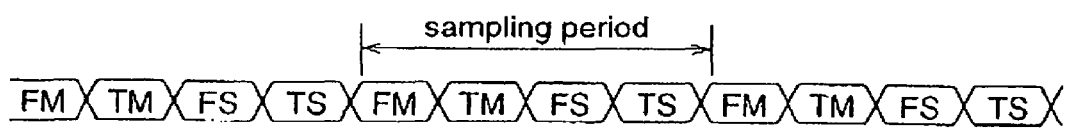
FIG. 11 is a timing chart for explaining the operation of the conventional sampling unit.
Figure 12:
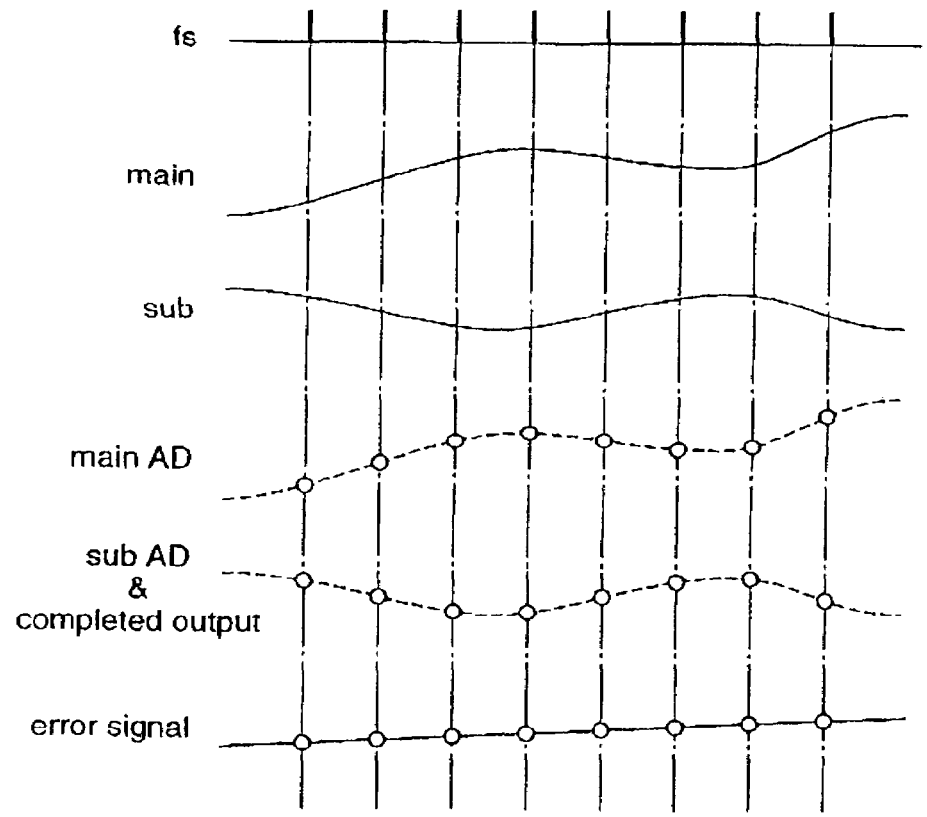
FIG. 12 is a waveform diagram for explaining the operation of the conventional servo error detection circuit.

FIG. 9 is a waveform diagram for explaining the operation of the servo error detection circuit according to the first embodiment in the case where the third completion processing is carried out.

FIG. 9 shows, from top to bottom, a sampling timing signal (fs) of the main error signal as the first sampling timing; a sampling timing signal (fs/2) of the sub error signal as the second sampling timing; a main error signal (main) outputted from the error signal 1F generator 3f or the error signal 1T generator 3t; a sub error signal (sub) outputted from the error signal 2F generator 4f or the error signal 2T generator 4t; an AD-converted output of the main error signal (main AD) stored in the register 10f or 10t; a signal comprising an AD converted output of the sub error signal (sub AD—white dot) stored in the register 11f or 11t, and the output of the predictive filter 41 (predictive data—black dot); and an error signal output (error signal) outputted from the adder 13f or 13t.

With reference to "sub AD & predictive data" shown in FIG. 9, the predictive filter 41 predicts a next change on the basis of the AD-converted output of the past sub error signal, which is outputted from the ADC 9, and simultaneously, converts the sampling frequency to the first sampling frequency fs, thereby generating predictive data of the sampling frequency fs.

Then, the AD-converted output of the main error signal which is stored in the register 10f (10t) and the completed output from the predictive filter of the completion unit 12f (12t) are added by the adder 13f (13t), resulting in an error signal output (error signal).

As described above, since the completion unit 12f (12t) performs the third completion processing using the predictive filter 41, the second sampling unit can perform sampling using an arbitrary second sampling timing, whereby the sub sampling timing generator 7 shown in FIG. 1 is dispensed with. As a result, an accurate completed signal can be generated with reduced circuit scale.

As described above, the servo error signal generation circuit according to the first embodiment is provided with the first sampling unit 6 for sampling, at the first sampling timings, the first detection signals outputted from the main photoreceptor; the second sampling unit 8 for sampling, at the second sampling timings, the second detection signals which are detected by the plural photoreceptors and assist or correct the first detection signals; the AD converter 9 for AD-converting the data sampled by the first sampling unit 6 and the second sampling unit 8; and the completion unit for completing the data sampled by the second sampling unit 8. Therefore, even when the conversion speed of the ADC 9 is low, a high sampling frequency can be maintained while maintaining the effect of correcting the error signals by the second detection signals.

The servo error signal generation circuit according to the first embodiment employs, as an error signal generation method, the differential push-pull and differential astigmatic method in which a main beam is received by a four-part photoreceptor, and each of two sub beams is received by a four-part photoreceptor. However, the application of the present invention is not restricted thereto, and the present invention is applicable to any method for generating error signals using plural photoreceptor signals.

The servo error signal generation circuit according to the present invention is characterized by that the sampling frequency for error signals can be increased even when the conversion speed of the AD converter is low, and is useful as a component of an optical disc playback apparatus.

What is claimed is:

1. A servo error signal generation circuit for generating a servo error signal using reflected light from an optical disc, which is detected by plural photoreceptors, said circuit comprising:
   a first sampling unit for sampling, at first sampling timings, first detection signals which are outputted from the plural photoreceptors;
   a sub sampling timing generator for periodically thinning out the first sampling timings to generate second sampling timings having a reduced sampling frequency;
   a second sampling unit for sampling, at the second sampling timings, second detection signals which are outputted from plural photoreceptors and assist or correct the first detection signals;
   an AD converter for analog-to-digital converting the data which have been sampled by the first sampling unit and the second sampling unit; and
   a completion unit for completing the data of the timings which have been thinned out by the sub sampling timing generator, among the data which have been sampled by the second sampling unit and outputted from the AD converter.

2. The servo error signal generation circuit as defined in claim 1 wherein said completion unit performs completion using the values of sampling data which have just previously been sampled by the second sampling unit.

3. The servo error signal generation circuit as defined in claim 1 wherein said completion unit performs completion using the values of sampling data which have just previously been sampled by the second sampling unit and, thereafter, compensates phase delay of the completed data.

4. The servo error signal generation circuit as defined in claim 1 wherein said completion unit further comprising:

a difference detector for detecting a difference between the data which are sampled by the first sampling unit and the data which have just previously been sampled by the first sampling unit;
   a holding unit for outputting the sampling data which have just previously been sampled by the second sampling unit; and
   a difference completion unit for generating completed data by subtracting or adding the difference detected by the difference detector from/to the values of the just-previous sampling data outputted from the holding unit.

5. The servo error signal generation circuit as defined in claim 4 wherein a low-pass filter for noise removal is provided at either or both of the front and the rear of the difference detector.

6. A servo error signal generation circuit for generating a servo error signal using reflected light from an optical disc, which is detected by plural photoreceptors, said circuit comprising:
   a first sampling unit for sampling, at first sampling timings, first detection signals outputted from the plural photoreceptors;
   a second sampling unit for sampling, at second sampling timings, second detection signals which are outputted from the plural photoreceptors, and assist or correct the first detection signal;
   an AD converter for analog-to-digital converting the data which have been sampled by the first sampling unit and the second sampling unit; and
   a completion unit for generating completed data synchronized with the first sampling by predicting a next change on the basis of the data which have been sampled by the second sampling unit and outputted from the AD converter.

7. The servo error signal generation circuit as defined in claim 6 wherein said second sampling timings are generated independently of the first sampling timings, and are not synchronized with the first sampling timings.

8. A servo error signal generation method for generating a servo error signal using reflected light from an optical disc, which is detected by plural photoreceptors, said method comprising:
   a first sampling step of sampling, at first sampling timings, first detection signals which are outputted from the plural photoreceptors;
   a sub sampling timing generation step of periodically thinning out the first sampling timings to generate second sampling timings having a reduced sampling frequency;
   a second sampling step of sampling, at the second sampling timings, second detection signals which are outputted from plural photoreceptors and assist or correct the first detection signals;
   an AD conversion step of analog-to-digital converting the data which have been sampled in the first sampling step and the second sampling step; and
   a completion step of completing the data of the timings which have been thinned out in the sub sampling timing generation step, among the data which have been sampled in the second sampling step and AD-converted in the AD conversion step.

9. The servo error signal generation method as defined in claim 8 wherein said completion step performs completion using the values of sampling data which have just previously been sampled in the second sampling step.

10. The servo error signal generation method as defined in claim 8 wherein said completion step performs completion using the values of sampling data which have just previously been sampled in the second sampling step and, thereafter, compensates phase delay of the completed data.

11. The servo error signal generation method as defined in claim 8 wherein said completion step further comprising:

a difference detection step of detecting a difference between the data which are sampled in the first sampling step and the data which have just previously been sampled in the first sampling step;

a holding step of outputting the sampling data which have just previously been sampled in the second sampling step; and a difference completion step of generating completed data by subtracting or adding the difference detected in the difference detection step from/to the values of the just-previous sampling data outputted from the holding step.

12. A servo error signal generation method for generating a servo error signal using reflected light from an optical disc, which is detected by plural photoreceptors, said method comprising:

a first sampling step of sampling, at first sampling timings, first detection signals outputted from the plural photoreceptors;

a second sampling step of sampling, at second sampling timings, second detection signals which are outputted from the plural photoreceptors, and assist or correct the first detection signal;

an AD conversion step of analog-to-digital converting the data which have been sampled in the first sampling step and the second sampling step; and a completion step of generating completed data synchronized with the first sampling by predicting a next change on the basis of the data which have been sampled in the second sampling step and AD-converted in the AD conversion step.

13. The servo error signal generation method as defined in claim 12 wherein said second sampling timings are generated independently of the first sampling timings, and are not synchronized with the first sampling timings.

* * * * *